United States Patent [19]

Mathews et al.

[11] 3,725,603

[45] Apr. 3, 1973

[54] AUDIO VISUAL PROGRAM RATING SYSTEM

[76] Inventors: Harold F. Mathews, 523 Cashmere Terrace, Los Angeles, Calif. 90049; Jack M. Reeder, 3626 Hampstead Street, Pasadena, Calif. 91103; James A. Ingram, 1197 Arden Road, Pasadena, Calif. 91106

[22] Filed: July 21, 1971

[21] Appl. No.: 164,553

[52] U.S. Cl. ....179/100.1 R, 179/2 AS, 179/100.1 C, 179/100.2 S, 346/37

[51] Int. Cl. ....G11b 15/18, G11b 27/28, G11b 31/00

[58] Field of Search.......179/100.1 R, 100.1 C, 100.1 PS, 179/100.2 S, 100.1 DR, 100.1 VC, 2 AS; 346/17, 20, 37

[56] References Cited

UNITED STATES PATENTS

| | | | |
|---|---|---|---|
| 3,647,991 | 3/1972 | Gaon et al. | 179/100.1 C |
| 2,677,018 | 4/1954 | Logan | 179/100.1 DR |
| 2,816,167 | 12/1957 | Muller et al. | 179/100.1 DR |
| 2,855,993 | 10/1958 | Rahmel | 346/37 |
| 3,653,058 | 3/1972 | Soundberg | 346/17 |
| 3,471,652 | 10/1969 | Moore et al. | 179/100.1 VC |
| 2,417,129 | 3/1947 | Rusch | 179/100.1 R |

*Primary Examiner*—Raymond F. Cardillo, Jr.
*Attorney*—J. Gibson Semmes

[57] ABSTRACT

A system and apparatus for rating users actual viewing or listening habits for radio and television, using voice recorders. The system uses voice recorders and information is periodically recorded and transmitted to recorders which are usable in a manner which determines actual viewing or listening habits of the ultimate users with a superior degree of accuracy with each television or radio set in an area of rating sample being equipped with its own instrument which records viewing and demographics while the program is actually being viewed.

8 Claims, 3 Drawing Figures

INVENTORS
HAROLD F. MATHEWS
JACK M. REEDER
JAMES A. INGRAM

J. Gibson Semmes
ATTORNEY

AUDIO VISUAL PROGRAM RATING SYSTEM

BACKGROUND OF THE INVENTION

Networks including television and radio have for a long time sought to determine accurately ratings of programs transmitted through various systems of information retrieval and analysis through consumer contacts. Traditional yardsticks of rating success such as gross rating points or total households are being discarded for a more realistic qualitative measurement in the nature of demographics, i.e., age, sex, income, ethnic groups, etc. Of accepted rating services currently in use, even without the above emphasis, is the Neilson report which uses an electronic scanning device attached to the back of a television set and which measures only the channel number and time of viewing. The A. R. B. television rating procedure uses a diary method which leaves in question the time that the viewing log was actually filled out, by whom it was filled out, and as well its accuracy in recalling viewing. Another system, the Telepulse, uses a roster recall method which generally reflects normal viewing as opposed to actual viewing. The present system contemplates a determination of actual viewing or listening habits with a far superior degree of accuracy than any of the established rating procedures and provides a system highly effective in results and overcoming deficiencies in prior known and used systems.

SUMMARY OF THE INVENTION

The present system determines actual viewing or listening habits of radio and television users by means of voice recorders and with a far superior degree of accuracy than any of established known rating procedures primarily because each television set or radio set in the sample area has its own instrument which records viewing and demographics while the program is actually being viewed.

In a preferred form the instrument to be used by the viewer or listener may take the appearance of a desk telephone for example so that the user will be dealing with a familiar object. The hand set preferably has only a microphone mounted therein and an electric clock is mounted in the telephone cradle and so constructed that it operates to close to switching circuits periodically, such as on the hour and half hour. The cradle controls two switches, one of which controls an indicator lamp and the other stop and start of a recording unit such as a tape recorder. The clock control switch serves to activate an oscillator, an indicator lamp and advances tape in the recorder for a pre-established duration of time, for example 2 seconds. The clock gives the user a convenient, accurate time source, while at the same time controlling the periodic advance of the tape and application of tone signal to the tape. Occupant catch-up recording is thus eliminated and an indicator lamp operated by the clock reminds the user that a service such as recording of viewing or radio listening should take place in the event that the television set or radio sets are turned on or a channel changed. The voice recorders can be selectively placed in homes or other establishments and the occupant instructed to record channel number or station to which the occupant is looking or listening, plus the exact time, plus names of persons viewing in the room at the time. The report into the telephone receiver would indicate name, channel or station, time and date as also names of additional viewer or listeners. The recorded information and a completed form by the user relating to family makeup, age, income, working children living at home, etc., will be returned to an analyzer unit and the information transcribed and sent to a computer service bureau for translation and recordal which will then establish consumer usage and listening or in other words the basis for rating. The ratings preferably are accomplished daily and the computerized information serves as a completely up-to-the-minute source of information. The furnished information accordingly is absolutely current as distinguished from prior types of services.

Additional and other objects and advantages of the invention will be more readily apparent from the following detailed description of an embodiment of the invention when taken together with the accompanying drawings in which:

FIG. 1 pictorially represents components as placed in a user establishment for functional utilization by the user;

Figure 1:
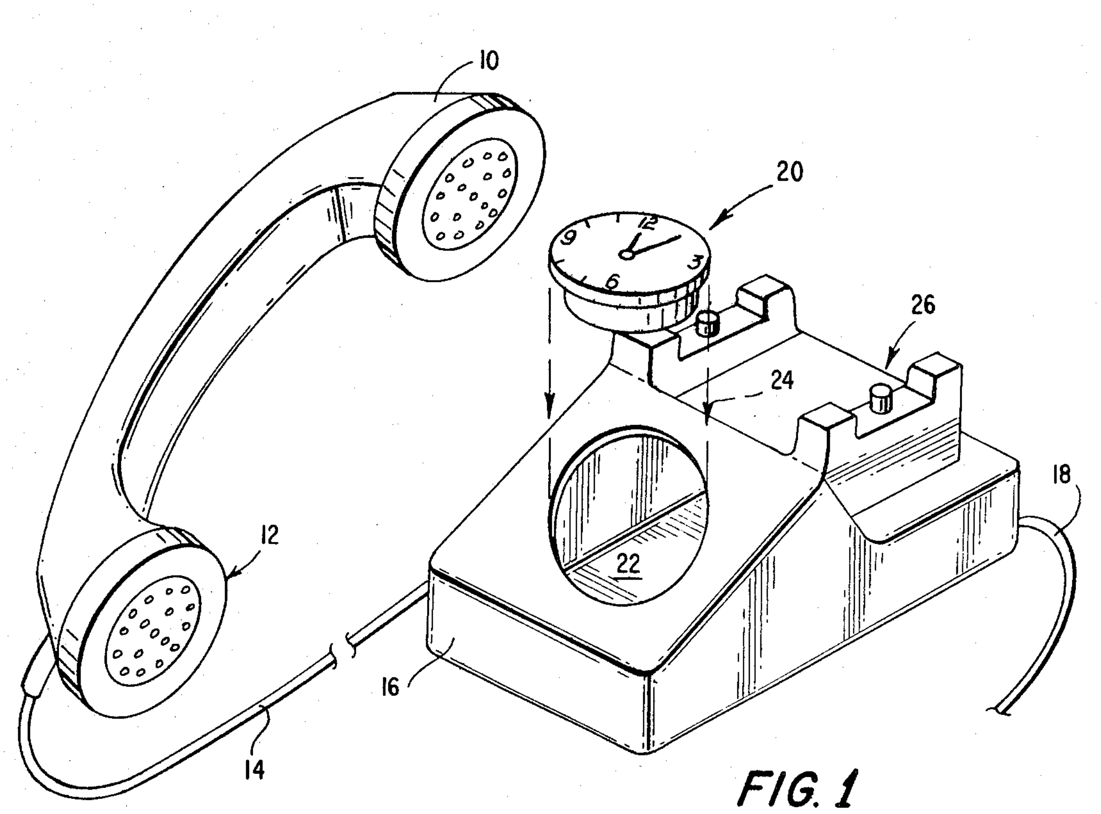

Referring now in more detail to the drawings, FIG. 1 shows the unit to be placed in a home or establishment to be used by a television viewer or radio listener to record desired information from which the rating can be established. The unit has the appearance of, for example, a desk telephone including a telephone receiver 10 devoid of standard components but in which a microphone would be installed in the mouthpiece 12 and from which leads wire 14 to the case 16. A wire or lead 18 extends from case 16 to a recording unit in the nature of a tape unit or the like. An electric clock 20 fits into the case in the normal dial area 22 as indicated by dash lines 24. The case cradle and buttons generally indicated at 26 such as normally used in telephone constructions control two switches, as will be described hereinafter, one of which controls an indicator lamp and the other the stop-start of a tape recorder unit or the like. The clock control switch activates an oscillator, the indicator lamp and advances the tape for a duration of approximately 2 seconds.

The clock provides the occupant with a convenient, accurate time source while it controls the periodic advance of the tape and application of tone signal to the tape. The indicator lamp operated by the clock reminds the occupant or user that a service, i.e., recording of viewing or the like should take place if the television set, for example, is turned on or the channel changed and the procedure makes it impossible for the occupant to play catch-up with his viewing recording.

Figure 2:
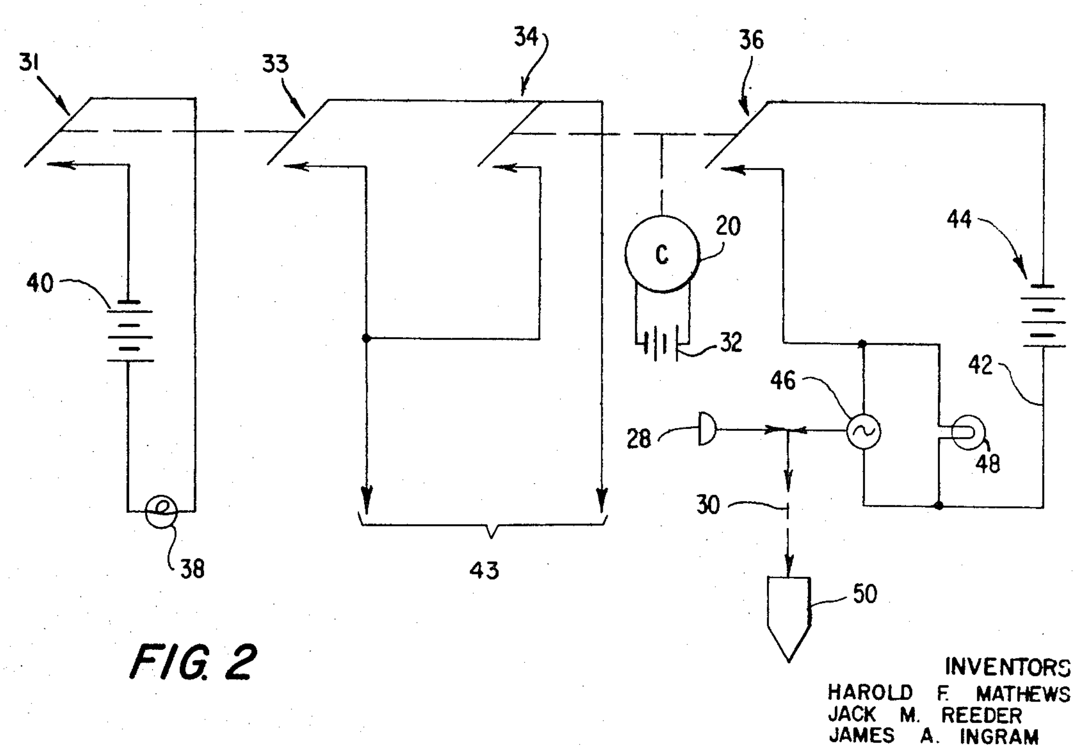
FIG. 2 is a schematic representation of the circuitry basically comprising the system in a simplified form.

FIG. 2 shows basic components of circuitry to be used in the overall circuit. For simplicity and illustration of principles, a microphone indicated at 28 is installed in mouthpiece 12 which is connected with microphone input indicated at 30. Clock 20 is shown as operated by a battery 32 and so constructed that it will close two switching circuits on the hour and half hour. The cradle and buttons 26 control two switches 31 and 33. Switch 31 controls an indicator lamp 38, again battery operated as at 40 with the indicator lamp serving for visual usage indication. Switch 33 operates the stop-start circuit of a recording unit generally designated 43. The recorder can be operated by battery 44 or other power supply. The 20 controls two switches 34 and 36. Switch 36 activates oscillator 46 and indicator lamp 48. Switch 34 operates the on-off contact and relay of the recording unit and advances the tape by means of a motor, not shown, for the desired time interval.

The clock gives the occupant a convenient, accurate time source while it controls the periodic advance of the tape and application of the tone signal to the tape. The input to the microphone is ultimately passed to a tape record head 50 which functions in a normal manner.

Figure 3:
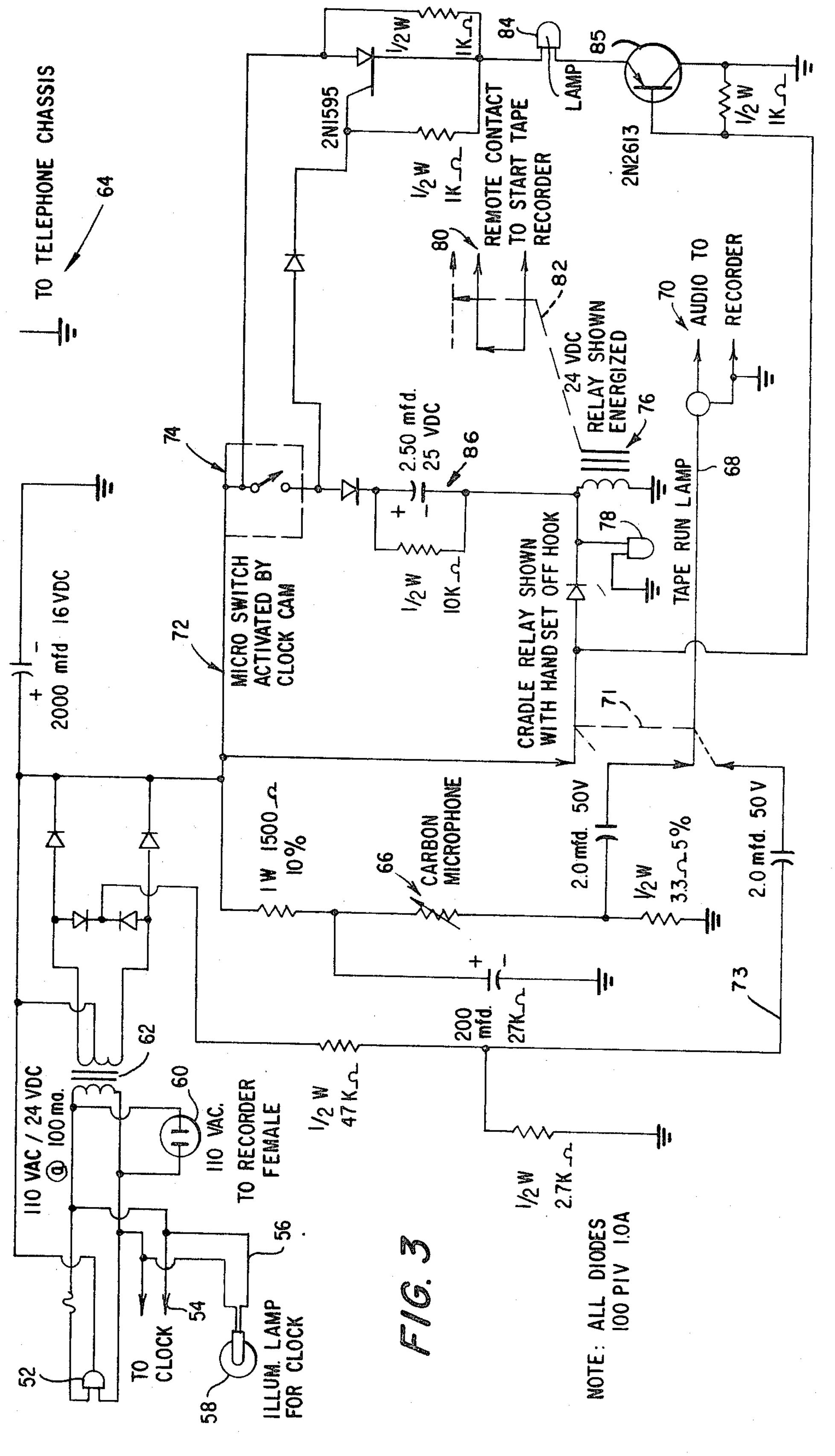
FIG. 3 is a schematic of a preferred circuit for practicing the invention.

FIG. 3 shows an overall circuit for practicing the invention of the system and the various components operatively connected in the circuit. The circuits in this instance while related with the basic schematics of FIG. 2 are connected into a normal current supply such as 110 volt AC by a usual plug-in connector as at 52. Leads 54 are connected to clock 20 and operatively connected thereto by leads 56 is illuminating lamp 58 for the clock. Also connected into this circuitry is a female socket or receptacle 60 for attaching a usual tape recorder or the like to the 110 volt AC source. Transformer 62 converts the 110 volt AC to 24 volt DC current. The telephone chassis connection is generally indicated at 64 with appropriate grounding as shown. A carbon or the like microphone 66 of appropriate type is interconnected in the circuit as shown with functional designations of circuitry components with a lead therefrom 68 constituting audio input to recorder as indicated at 70. Lead 72 from the microphone connection is connected to microswitch 74 activatable by a cam on the clock. The telephone set is provided with a cradle relay 76 shown with the handset off the hook and the relay shown as being energized. A tape run lamp 78 is appropriately interconnected into this circuit for operation by the handset being raised to operative position. Remote contact 80 is provided and interconnected as appropriately indicated by broken lines at 82 to start the tape recorder upon energization by the clock and functionally operated from the handset. The dashed lines at switches 71 and 80 show the connections with the handset on the hook. An indicator lamp 84 is also connected with the microswitch 74 for functional operation in the circuit as shown. All diodes are 100 PIV 1.0 amp. The indicator lamp 84 is so arranged that it becomes illuminated at the time the clock 20 periodically switches the recorder on by switch 74. The indicator lamp 84 could be any other type alarm device, such as, for example, a buzzer, blinking light, bell or the like. When the clock actuates switch 74 with the handset on the hook, current flows through RC circuit 86 for a limited period and energizes relay 76, closing contact 80 and turning on the tape recorder. An alternating current tone signal on line 73 from the power supply is permitted by switch 71 to reach the recorder, via line 68. The indicator lamp 84 or other alarm device remains on until the hand set 10 is removed from the cradle 26, thus forcing the triode 85 into an off state.

Functionally, when viewers position themselves in the area of a television set, radio, or other device, the operation of which is to be monitored, the indicator lamp 84 or the like on the device attracts the attention of the user, viewer or the like. The indicator lamp 84, 38 or other alarm device goes off only upon removal of the head set 10 from the cradle 26. The recorder, not shown, is thus activated and the user, viewer or the like, by speaking into the mouthpiece 12 will record such information as name, channel or station, time and date and persons also present during the media reception or machine operation. At a periodic time later, the clock 20 will actuate microswitch 74, which will in turn actuate the indicator lamp 84, or other similar alarm device, once again. The periodic time will be determined by that period after which the television set, radio or other device the operation of which is to be monitored, would normally be changed. Once again, the indicator lamp 84 or other alarm device, will remain remain activated until the headset 10, containing the mouthpiece 12 and microphone 66, is lifted from the cradle 26 and the new conditions of use or operation are recorded.

Normally, in operation a printed form is left with the occupant or user with the request to complete and mail to the proprietor. A coded number on the form and the number on the installed unit are the same. On the form the occupant will be asked questions as to the makeup of the family — age (husband between 35 and blank, wife between 25 and blank, etc.) — income of husband ($15,000 to $20,000, etc. ) — working children who live at home, etc. It can be presumed that this information would be accurate inasmuch as the occupant would note that the information is confidential. Finally, the occupant is told that if the user's family satisfactorily completes logging of the television or radio information requested such as for 8 days, the user will receive a reward or stipend. The information recorded on the tapes is transcribed to a form by the proprietor and the information is then sent to a computer service bureau where all information will be correlated and keypunched on cards. The keypunch operator then files all this information to the computer which would then store the information. Once the information is stored in the computer an outstanding unique feature of the service can be established. Because the ratings are done daily the computer is used as a completely up-to-the-minute source of information. Substantially immediate furnishing of current information saves media buyers time and skills and the results are outstanding.

The circuit is so designed that if desired the lamp is activated at the appropriate time for approximately 15 seconds, as an example, to indicate that the tone signal has been impressed upon the tape, a possible automatic function with the timing circuit, and will remain on until such time as the microphone, handpiece, is lifted from its cradle and replaced.

Manifestly, minor changes and variations can be effected in the wholly illustrative embodiments without departing from the spirit and scope of the invention as defined in and limited solely by the appended claims.

We claim:

1. Apparatus for use in an audio-visual program rating system, comprising in electrical circuit:
   - A. audio signal recording means, said means including an on-off actuating contact;
   - B. microphone means for producing an audio signal to said recording means;

C. a movable mount attached to said microphone means, said mount having a rest position;

D. switch means, in actuable relation to said recording means contact upon movement of said microphone mount from said rest position, whereby said audio signal is recorded;

E. timing means operable to periodically actuate said switch means, whereby said recorder contact may be actuated irrespective of the position of said mount;

F. tone signal means operative to direct a signal to said recorder when said timing means actuates said switch; and G. indicating means operative when said microphone mount has been moved from said rest position and when said timing means has actuated said switch means.

2. Apparatus for use in an audio-visual program rating system, comprising in electrical circuit:

A. means for recording audio signals, said means including an on-off actuating contact;

B. microphone means for producing an audio signal to said recording means;

C. a movable mount attached to said microphone means, said mount having a rest position;

D. relay means for actuating said recorder contact upon movement of said microphone mount from said rest position, whereby said audio signal is recorded;

E. timing means for periodically actuating said relay means, whereby said recorder contact may be actuated irrespective of the position of said mount;

F. means for directing a tone signal to said recorder when said timing means actuates said relay; and G. means for indicating when said microphone mount has been moved from said rest position and when said timing means has actuated said relay means.

3. The apparatus of claim 2 wherein said timing means comprises an electric clock including a cam and first switching means for actuating said relay upon periodic contact by said cam.

4. The apparatus of claim 3, wherein said indicating means comprises a switch actuated by movement of said mount, a first lamp in circuit with said switch and a second lamp in circuit with the first switching means of said timing means.

5. The apparatus of claim 3, wherein said tone signal means comprises an oscillator, and means for connecting said oscillator to said recorder upon actuation of said recorder by said relay means.

6. The apparatus of claim 3 including a simulated telephone stand base and a hand piece coactable with said base, said microphone being mounted in the simulated telephone mouthpiece and said electric clock being mounted in said case, said base including depressable buttons actuable upon removal or replacement of said handpiece in the cradle of said base, said buttons controlling actuation of the relay means.

7. The apparatus of claim 3 wherein said first switching means includes means for actuating said relay for a limited time following contact by said cam.

8. The apparatus of claim 7, wherein said tone signal means comprises an alternating current signal source, second switching means for connecting said source to said recorder and means for actuating said second switching means when said mount is in the rest position.

* * * * *